United States Patent [19]

Landi

[11] Patent Number: 5,203,607
[45] Date of Patent: Apr. 20, 1993

[54] BICYCLE SEAT

[75] Inventor: Curtis L. Landi, Mountain View, Calif.

[73] Assignee: Supracor Systems, Inc., Sunnyvale, Calif.

[21] Appl. No.: 625,501

[22] Filed: Dec. 11, 1990

[51] Int. Cl.⁵ .................................. B62J 1/18
[52] U.S. Cl. ......................... 297/214; 297/DIG. 1; 297/452; 297/458
[58] Field of Search ............... 297/214, DIG. 1, 195, 297/458, 452; 5/451

[56] References Cited

U.S. PATENT DOCUMENTS

| | | | |
|---|---|---|---|
| 2,248,413 | 7/1941 | Rathbun | 297/DIG. 1 X |
| 2,613,722 | 10/1952 | Ruppert | 297/195 X |
| 3,000,020 | 9/1961 | Lombard et al. | 297/DIG. 1 X |
| 3,080,579 | 3/1963 | Gordon | 297/452 X |
| 3,091,497 | 5/1963 | Houser | 297/452 X |
| 3,362,749 | 1/1968 | Clement | 297/452 X |
| 3,616,171 | 10/1971 | Hoskinson | 297/458 X |
| 3,663,973 | 5/1972 | Spence | 5/451 X |
| 3,844,611 | 10/1974 | Young | 297/195 X |
| 3,987,507 | 10/1976 | Hall | 297/DIG. 1 X |
| 3,997,214 | 12/1976 | Jacobs | 297/DIG. 1 X |
| 4,218,090 | 8/1980 | Hoffacker et al. | |
| 4,429,915 | 2/1984 | Flager | |
| 4,522,447 | 1/1985 | Snyder et al. | 297/DIG. 1 X |
| 4,611,851 | 9/1986 | Noyes et al. | |
| 4,733,907 | 3/1988 | Fellenbaum | |
| 4,815,361 | 3/1989 | Chiarella | 297/214 |
| 4,842,332 | 6/1989 | Conner et al. | |
| 4,898,426 | 2/1990 | Schulz et al. | 297/452 |

Primary Examiner—Kenneth J. Dorner
Assistant Examiner—Milton Nelson, Jr.
Attorney, Agent, or Firm—Rosenblum, Parish & Isaacs

[57] ABSTRACT

An improved bicycle seat comprising a rigid shell supporting a foam layer having a pad of thermoplastic elastomer honeycomb either bonded thereto or embedded within said foam. A durable skin covers the shell, foam and padding layers. In an alternative embodiment, the foam, padding and covering skin are combined in a seat cover to be used over a standard bicycle seat.

2 Claims, 7 Drawing Sheets

BICYCLE SEAT

BACKGROUND OF THE INVENTION

1. Field of the Invention

The present invention relates generally to ergonomic bicycle seats, and more specifically to bicycle seats having a section or layer of thermoplastic elastomeric honeycomb padding within the foam layer of the seat.

2 Brief Description of the Prior Art

Early attempts to cushion the ischial bones of bicycle riders consisted of padded seat covers, which were used to cover a stock bicycle seat. Numerous problems arose with these types of seat covers. Often the materials used for the padding—such as foam, rubber, air or water bags—were either too firm or too soft for adequate comfort. Additionally, after a prolonged period of use, the covers would chafe and rub the thighs of the rider, and the fastening means would loosen causing the cover to slip out of alignment with the seat.

In response to the problems with seat pads or covers, multilayer bicycle seats were introduced. Instead of covering a stock bicycle seat, the multilayer seats directly replaced the stock bicycle seats. Most prior art seats combine a rigid shell affixed to foam padding with a durable cloth covering both. Seats such as those disclosed in Chiarella U.S. Pat. No. 4,815,361, also included an encapsulated layer of gel material disposed between the rigid shell and the cloth cover.

When downward pressure is placed on a Chiarella type seat (by the rider's ischial bones), the gel disperses laterally away from the point of pressure. Also, the gel breaks apart readily with repeat use. This reduces the effectiveness of the gel as a shock absorber because the rider's ischial bones rest on a thin layer of gel only. Further, the gel must be confined to lay in a horizontal plane and thus cannot be placed along the sides of the seat for lateral shock absorption. The gels used in bicycle seats are heavy, adding weight to the bicycle which is undesirable to the rider.

Another option to the multilayered bicycle seat is the use of a layer of stiff rubber immediately below the covering material. Adding more layers of material to a seat increases the expense of manufacture and decreases the longevity of the seat due to wear caused by the friction that occurs between the layers of seat padding when the seat is being used.

SUMMARY OF THE INVENTION

It is therefore a primary objective of the present invention to provide an improved bicycle seat having a first layer of conventional foam padding and a second layer of thermoplastic elastomeric honeycomb padding within its inner construction, providing improved shock absorption and increased rider comfort.

Another objective of the present invention is to provide a longer wearing bicycle seat using a higher quality padding so that fewer layers of cushioning material are needed.

A further objective is to provide an improved bicycle seat which can still be manufactured using existing bicycle seat manufacturing tooling and equipment.

Briefly, a preferred embodiment of the present invention includes a hard plastic or metal bicycle seat shell with a layer of resilient foam padding affixed to the upper surface thereof. A layer of thermoplastic elastomeric honeycomb padding substantially covering the top area of the seat is bonded to the topside of the foam layer. The shell, foam layer and honeycomb padding assembly are then upholstered with a soft, durable covering skin.

As an alternative to a one-piece layer of thermoplastic elastomeric honeycomb padding, two or more honeycomb pads can be disposed on or in the foam in a pattern that maximizes the protection of the rider's ischial and pelvic bones. Another alternative is to use honeycomb padding that has been faced on one side only, thereby increasing the softness of the seat. A further alternative includes continuing the layer of honeycomb padding to follow an upwardly curving back wall of the seat.

The improved bicycle seat of the present invention overcomes the problems associated with the prior art, in that it provides a bicycle seat with highly effective shock absorption characteristics in both vertical and lateral directions through the use of only one layer of thermoplastic elastomeric honeycomb padding in addition to a foam layer. The eye beam walls of the honeycomb will radiate outwardly from the point of pressure, thus providing maximum support and shock absorption for the rider. Additionally, the honeycomb padding can be deflected downwardly along the sides of the seat for maximum coverage. Because there is no lateral movement of the honeycomb padding, the friction between the two layers of seat material is kept to a minimum, creating a longer wearing seat.

An important advantage of the present invention is that the thermoplastic elastomeric honeycomb padding used in the construction of the seat is an anisotropic material having improved shock absorption qualities as well as durability and rapid recovery characteristics.

Another advantage of the present invention is that only one layer of thermoplastic honeycomb padding is necessary, thus reducing the manufacturing costs and increasing the wear life of the seat.

A further advantage of the present invention is that the honeycomb padding can be implanted into a recess in the foam layer so that the padding cannot move laterally within the seat.

Yet another advantage of the present invention is that the honeycomb padding can be perforated so that upon impact, the shock is absorbed as the encapsulated air is vented through the holes.

These and other objects and advantages of the present invention will no doubt become apparent to those skilled in the art after having read the following detailed description of the preferred embodiment which is contained in and illustrated by the various drawing figures.

DETAILED DESCRIPTION OF THE PREFERRED EMBODIMENT

Figure 1:
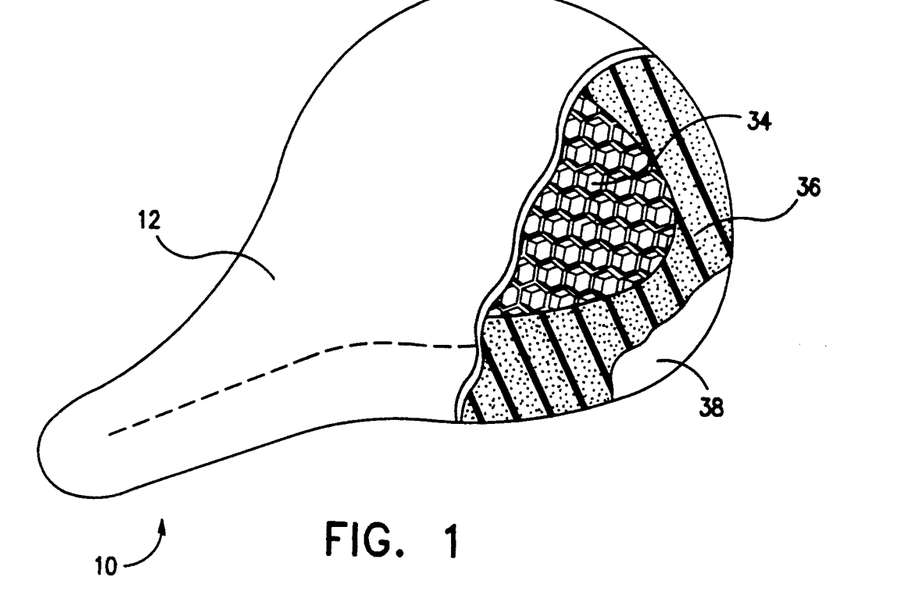
FIG. 1 is perspective view of an improved bicycle seat of the present invention partially broken to show the covering skin, rigid shell, foam layer and honeycomb padding of its inner construction.

FIG. 1 shows a seat 10 of the present invention partially broken away to show its inner construction. The skin 12 covering the seat 10 is made of a durable material that can withstand the effects of natural elements such as sun and rain as well as body fluids (sweat) yet still remain soft and flexible.

The novelty of this invention is in the use of a layer of thermoplastic elastomeric honeycomb-structured padding 34 within the inner construction of the seat to absorb the shocks inherent in bicycle riding and to provide increased comfort for the rider. The layer of honeycomb 34 is affixed atop a layer of foam padding 36 which makes up the greatest volume of the seat 10. The foam layer 36 is supported by the rigid shell 38 which forms the base of the seat 10 and includes means 39 (FIG. 3b) for attaching the seat to a bicycle frame.

Figure 2:
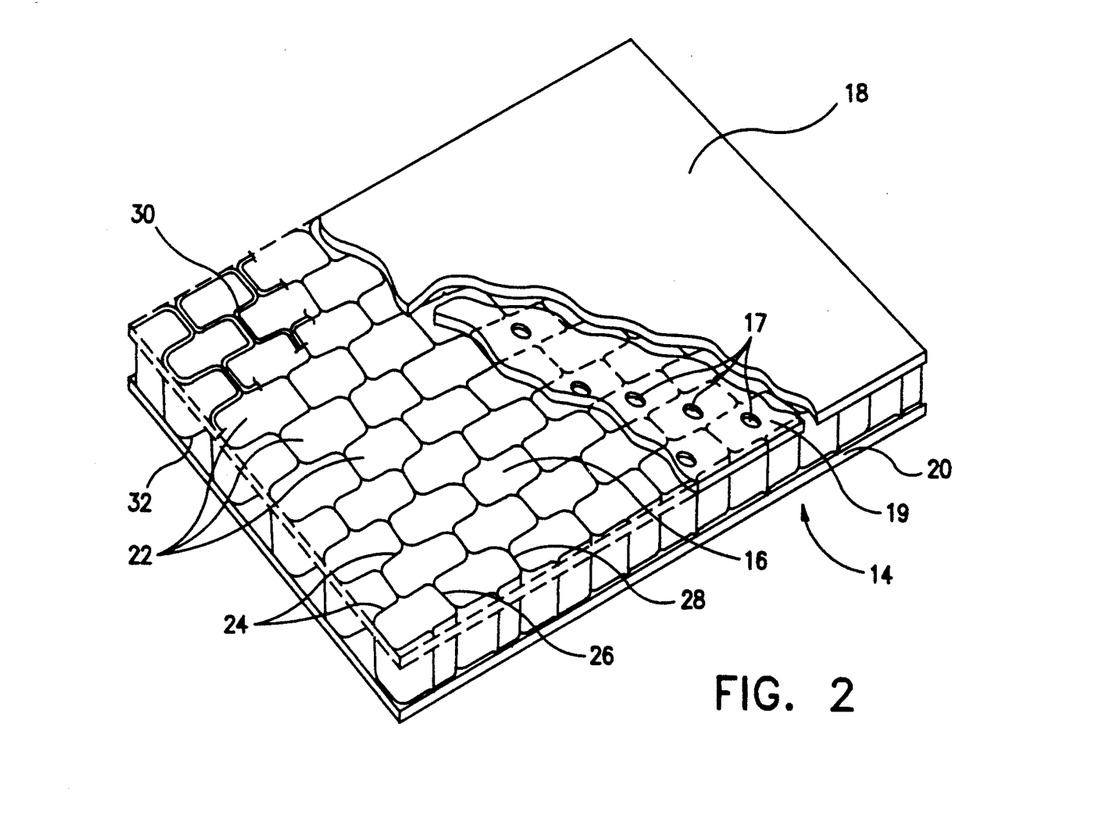
FIG. 2 is a perspective view of a piece of honeycomb cored stock from which the bicycle seat padding is cut.

FIG. 2 illustrates a piece of honeycomb stock 14 from which the padding 34 for the bicycle seat is cut. The stock 14 includes a block of honeycomb-structured core 16 made of thermoplastic material that is bonded to and sandwiched between two thermoplastic facings 18 and 20.

The honeycomb core 16 is made from ribbons of an advanced grade thermoplastic elastomeric material that are compression bonded together at spaced intervals staggered between alternate sheets. This pattern of bonding creates a honeycomb network of elongated, generally hexagonally shaped cells when the bonded stack of ribbons is expanded.

Each cell 22 of the honeycomb core 16 is defined by four generally S-shaped wall segments, each of which is shared by an adjacent cell. The wall segments of each cell 22 include single thickness wall portions 24 and double thickness wall portions 26 and 28, the latter portions being disposed on each side of the cell where the side wall of one cell is compression bonded to the side wall of an immediately adjacent cell.

The upper and lower extremities of the walls forming the several cells are deformed during a planarization operation as disclosed in our copending U.S. patent application Ser. No. 07/446,320 filed Dec. 4, 1989 and create upper and lower surfaces 30 and 32 of the honeycomb core. Facings 18 and 20, made from a resilient thermoplastic material, can be thermal compression bonded to the top and bottom surfaces 30 and 32 while the core is held in an expanded configuration. The addition of the facings encapsulates air within each cell.

The padding 34 (FIG. 1) is then cut from this honeycomb stock 14. The padding's shock absorption and spring-back characteristics result from the use of encapsulated air as well as the use of thermoplastic (or thermoplastic elastomeric materials) for both the honeycomb core 16 and the facings 18 and 20.

The honeycomb padding is tear resistant and highly resilient, yet extremely light weight. Bare honeycomb (without facings) is 93% air, and is lighter than the foams normally used in bicycle seat padding. Even with the facings attached, the weight of the padding compares favorably with that of the foams.

Another important quality of this padding is that it is an anisotropic three-dimensional structure which has varying degrees of flex in its length, width and thickness dimensions. Selected combinations of elastomeric material, honeycomb cell configuration, core thickness and facing material variables will determine the padding's softness or hardness, resilient recovery rate and rigidity or flex. Additionally, by selection and combination of the ribbons of material that make up the honeycomb core of the padding, the resultant padding can be made to vary in stiffness from one side of the pad to the other. Thus, for example, the seat padding can be made to have a greater durometer and lesser flexibility along the outer area and a lesser durometer and greater flexibility toward the inner area of the padding or vice versa.

Environmental additives can be incorporated into the material of the thermoplastic padding to combat the effects of body fluids, salts, direct sun and other environmental hazards normally experienced by bicycle seats. A yellowing preventative and/or colors can also be added, and might be used where the skin of the seat is transparent or has a viewing window cut out through which the honeycomb padding can be seen (as will be further explained below).

The honeycomb padding for a bicycle seat can be bare honeycomb core, honeycomb core faced on one side only, or faced on both sides. Each of these configurations will have different stiffness (durometer) and flexibility characteristics. Bare honeycomb can be adhered atop the foam layer or placed within a bladder of gel, such as is suggested at 35 in FIG. 3b, to add form preserving integrity to the gel pad. Faced honeycomb can cap a foam layer or be sunk into pockets carved out of (or molded in) the foam layer in such a manner that the foam surrounds and holds the honeycomb padding in place. Alternatively the embedded pads can be held in place using a Velcro ® or similar fastener.

As indicated above, the honeycomb core 16 of the padding 34 contains wall segments that are flexible and resilient. A vertical force will cause the walls to deflect and bend in the direction of the force. When the vertical force is removed, the walls will regain their upright stance. Therefore, in a bicycle seat, when the rider's ischial bones press down on the honeycomb padding, the upper segments of the cell walls become angled and point toward the pressure source. Thus, the padding surrounds the rider's anatomy and the cell walls radiate outwardly therefrom. This configuration lends superior support and cushioning to the rider's anatomy due to the multiplicity of radially projecting straight cell wall segments.

In an alternative embodiment of faced honeycomb padding, one sheet 19 of facing material contains a plurality of holes or perforations 17. The shock from an impact upon this type of perforated padding will be absorbed as the air within each cell of the padding slowly escapes through the holes.

Figure 3A:
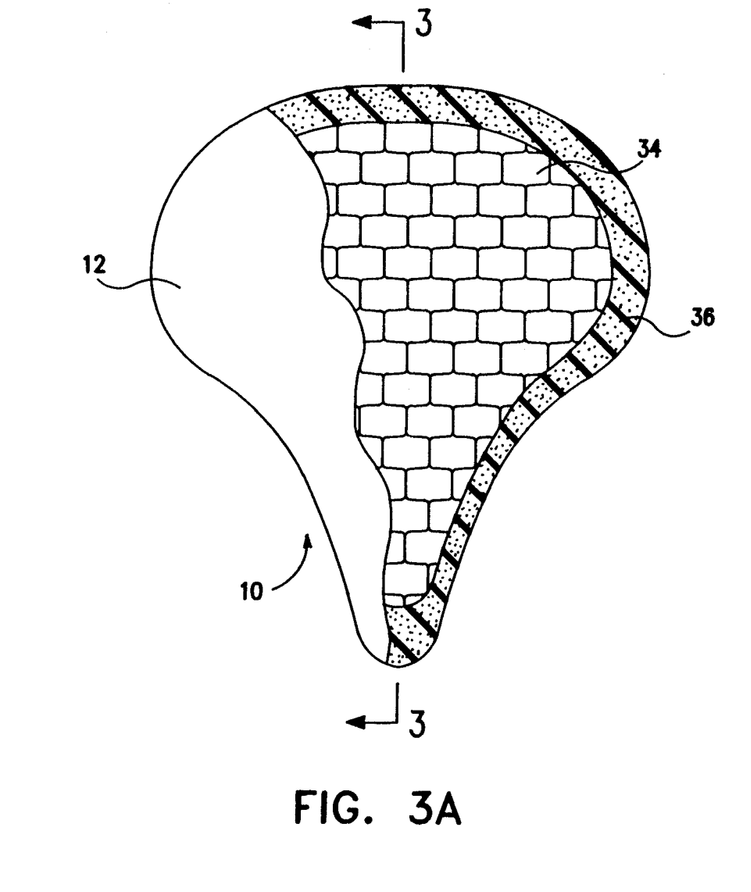
FIG. 3a is a partially broken top view of a bicycle seat of the present invention having a one-piece layer of thermoplastic honeycomb padding substantially covering the top of the seat.

FIG. 3a is a top view of the seat 10 in FIG. 1 with the covering skin 12 broken away. Exposed in FIG. 3a is a layer of faced thermoplastic elastomeric honeycomb padding 34 atop a foam seat layer 36. As depicted in FIG. 1, the foam layer 36 is attached to a hard plastic bicycle seat shell 38. The padding 34 is a one-piece construction covering a substantial portion of the top surface of the seat.

This embodiment provides support and cushioning to the skeletal anatomy of riders of any size. Because most of the top surface of the seat is padded, riders of various sizes, children through adults, will experience the full benefit and protection of the honeycomb padding.

Figure 3B:
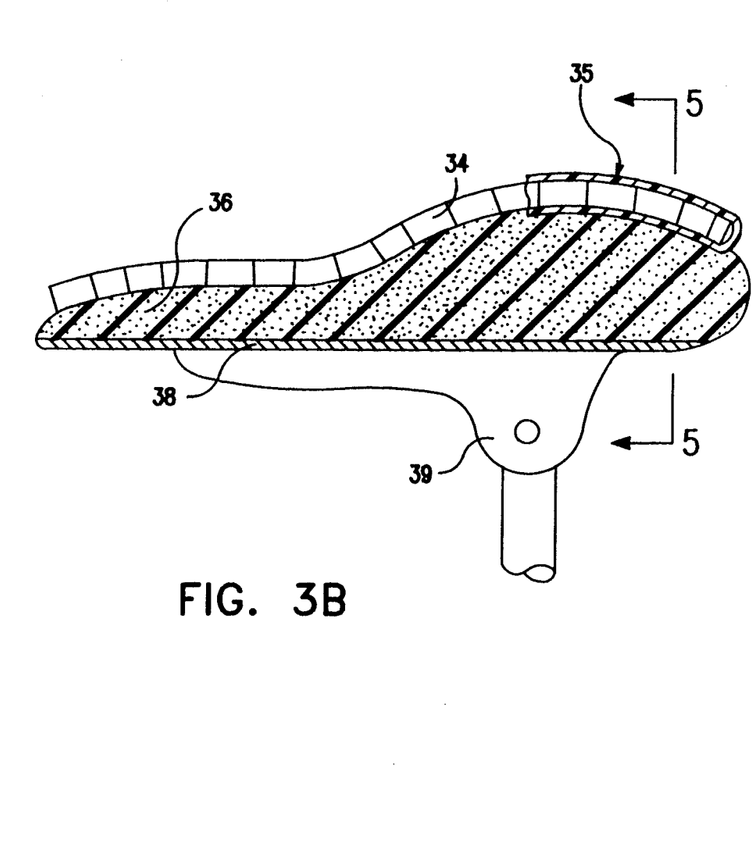
FIG. 3b is a cross sectional view, taken along the line 3—3 of FIG. 3a, showing the various strata of a seat with a layer of honeycomb padding disposed on top of the foam layer.

FIG. 3b is a cross sectional view taken along the line 3—3 of FIG. 3a, illustrating the strata of padding of an improved bicycle seat of the present invention. In this figure, a one-piece construction of faced honeycomb padding 34 is disposed on top of the foam layer 36. The foam layer is in turn affixed to the upper surface of the hard shell 38. The padding 34 is held in place by the skin 12, not shown, which covers the seat. Alternatively, the padding 34 can be adhered to the foam 36, or sunk into a cavity 58 molded in or cut out of the foam as will be discussed in more detail to follow.

Figure 4A:
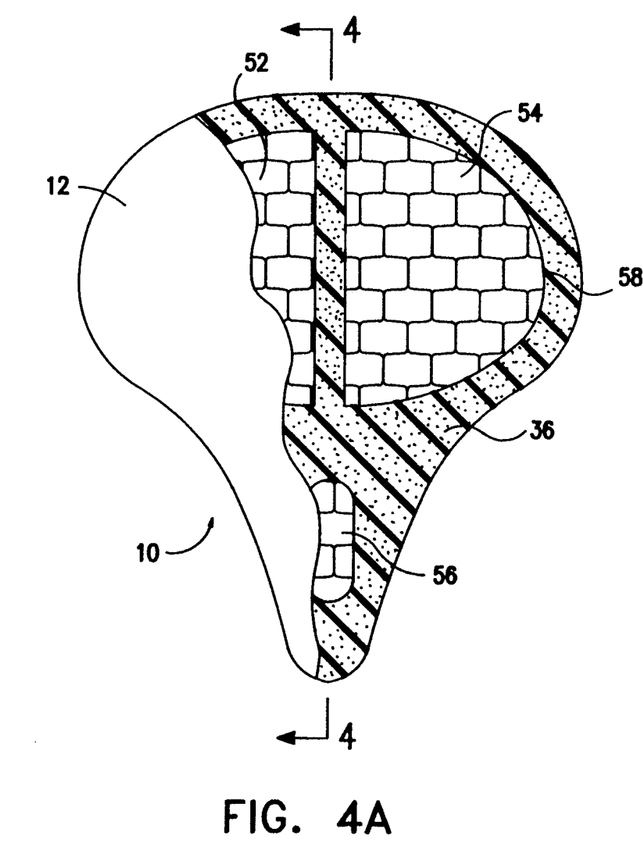
FIG. 4a is a partially broken top view of a bicycle seat, similar to that of FIG. 3a, but showing three separate sections of thermoplastic honeycomb pads, placed in a pattern that will protect the ischial and pelvic bones of a rider.

FIG. 4a is a top view of a seat with the covering skin 12 broken away showing three sections of padding 52, 54 and 56 as an alternative embodiment of the present invention. In this embodiment, sections of honeycomb padding 52, 54 and 56 are either disposed atop or embedded within pockets or cavities 58 formed in the foam layer 36 of the seat, in the areas where the rider's skeletal anatomy contacts the seat. Two pads of honeycomb 52 and 54 are placed towards the rear of the seat where the rider's ischial bones would make contact. One pad 56 is placed in the forward tongue of the seat to cushion the rider's genital area. This front pad 56 can also be depressed into a concave configuration as shown at 57 to better suit a man's anatomy.

Figure 4B:
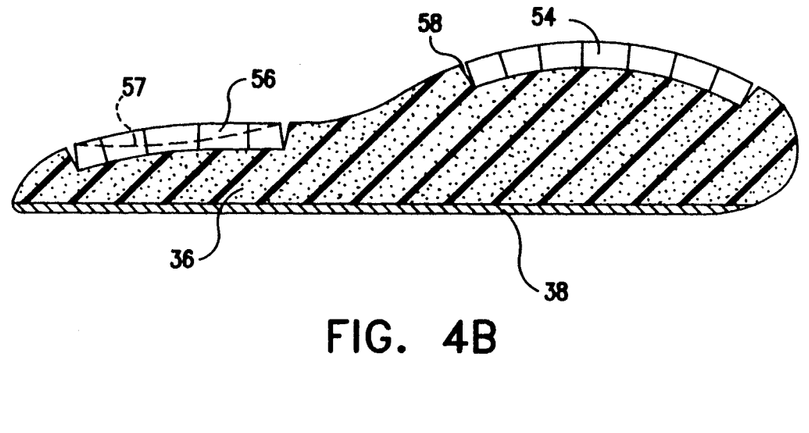
FIG. 4b is a cross sectional view, taken along the line 4—4 of FIG. 4a, showing a multiple pad configuration of the present invention.

FIG. 4b is a cross sectional view taken along the line 4—4 of FIG. 4a. It illustrates the multiple pad configuration of faced honeycomb padding that are disposed within cavities 58 in the foam layer 36 of the seat 10.

The pads are inserted into the cavities 58 such that their upper surfaces are flush with the outer surface of the foam 36, creating a smooth transition between the foam and honeycomb pads. This illustration also shows how the foam 36 surrounds the pads 54 and 56 and holds them in place.

Figure 4C:
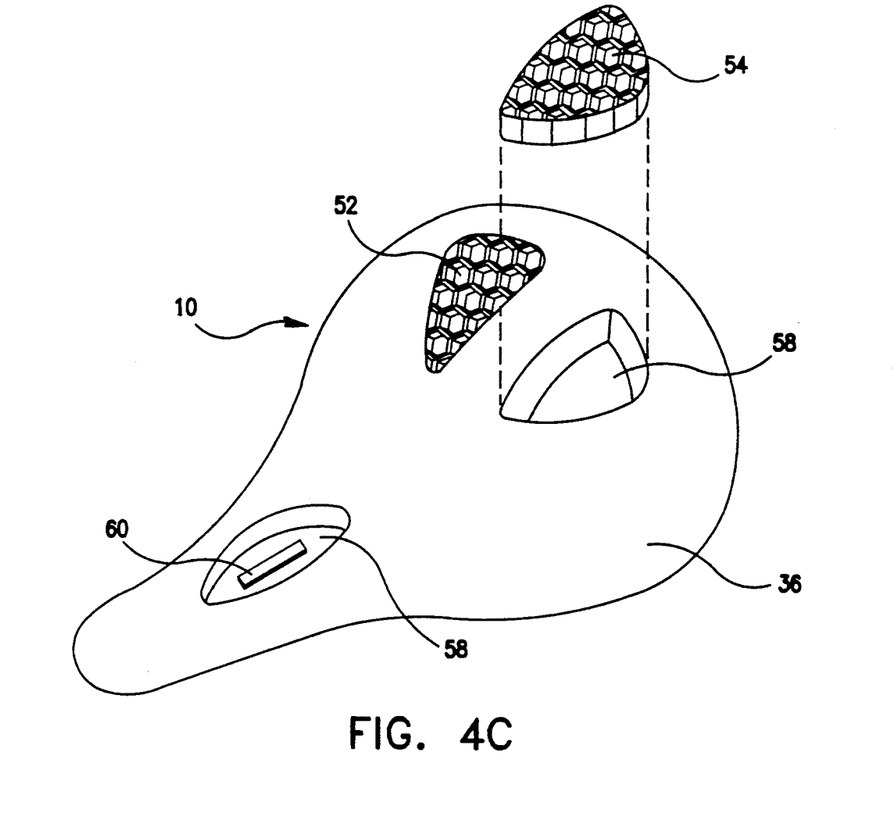
FIG. 4c is a perspective view of a bicycle seat with a multiple pad configuration illustrating how the independent sections of honeycomb padding can be fitted into cavities within the foam layer.

The foam's cavities 58 and padding inserts 52 and 54 are clearly illustrated in FIG. 4c. A honeycomb pad 54 is shown in exploded relationship above a cavity 58 within a foam layer of a seat 10 of this embodiment. The honeycomb pads are fitted into the cavities until their upper surfaces are flush with the outer surface of the foam as shown by embedded pad 52. The foam 36 surrounds the pad 52 and holds it in place. Alternatively, fastening means such as Velcro ® can be used to secure the pad within the foam. As shown in the forward cavity, a strip 60 of Velcro ® can be adhered to the bottom of the cavity and a mating strip of Velcro ®, not shown, can be adhered to the underside of the pad such that when the pad is inserted into the cavity, the Velcro ® strips will fasten together and secure the pad in place.

With this embodiment, a rider can purchase a standard, pocketed seat and then choose from a variety of honeycomb pad inserts having varying degrees of stiffness or softness. Thus the rider can customize his bicycle seat to his own personal level of comfort, and can also have an array of pad inserts on hand to be used for different types of riding. For example, he may use a softer pad for general road biking and a stiffer pad for mountain biking.

Figure 5A:
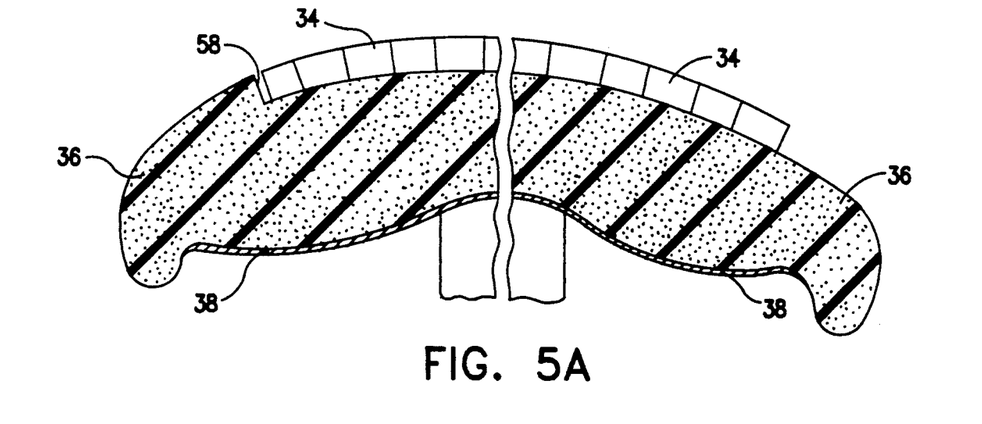
FIG. 5a is a cross sectional view taken along the line 5—5 of FIG. 3b, showing the various strata of a seat of the present invention and two alternative padding placement configurations.

FIG. 5a is a cross sectional view taken along the line 5—5 of FIG. 3b, showing the rigid shell 38, foam layer 36 and honeycomb padding 34. The padding 34 can cap the foam layer 36 (which in turn is atop the hard shell 38) as shown in the right half of the illustration, or be disposed within a cavity or pocket 58 recessed into the foam layer as shown in the left half of the illustration.

Figure 5B:
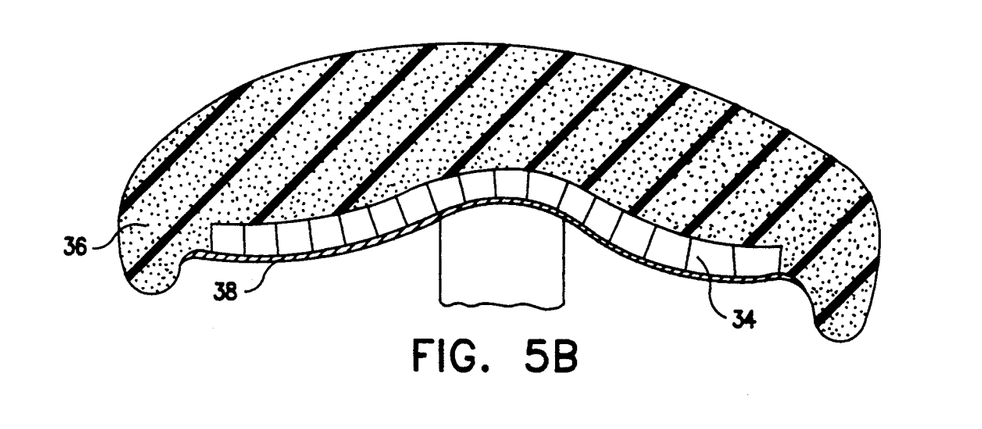
FIG. 5b is a cross sectional view similar to that of FIG. 5a showing an alternative configuration of the present invention, with the layer of honeycomb padding disposed between the foam and the shell.

FIG. 5b shows an alternative embodiment of a seat of the present invention with the honeycomb padding 34 disposed between the foam layer 36 and the hard shell 38 of the seat. This embodiment is practical for mountain bikers who experience extreme impacts while riding through rough terrain.

Figure 5C:
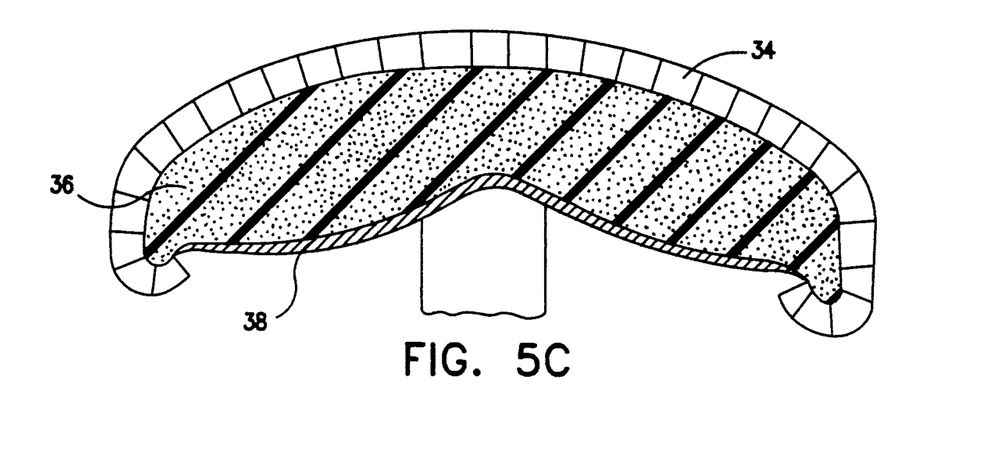
FIG. 5c is a cross sectional view similar to that of FIG. 5a showing another alternative configuration of the present invention, where the layer of honeycomb padding completely covers the top and sides of the seat.

FIG. 5c illustrates another alternative embodiment, where the padding 34 completely covers the whole seat, wrapping around the sides and under the shell. This alternative would provide added cushioning for the rider's thighs as well as his buttocks.

Figure 6A:
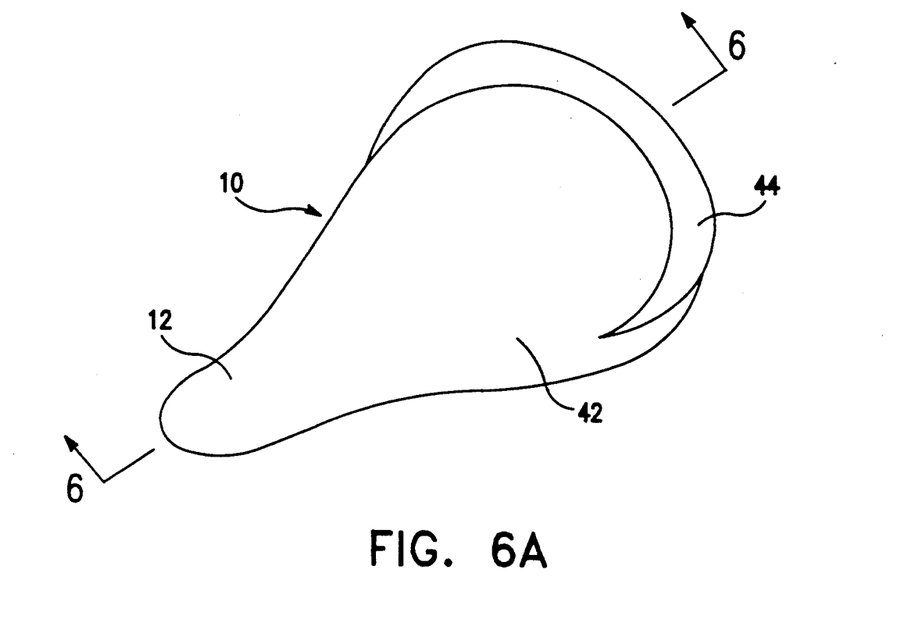
FIG. 6a is an alternative embodiment of a seat of the present invention, where the rear of the seat is extended upwardly to lend further support to the rider's coccyx.
Figure 6B:
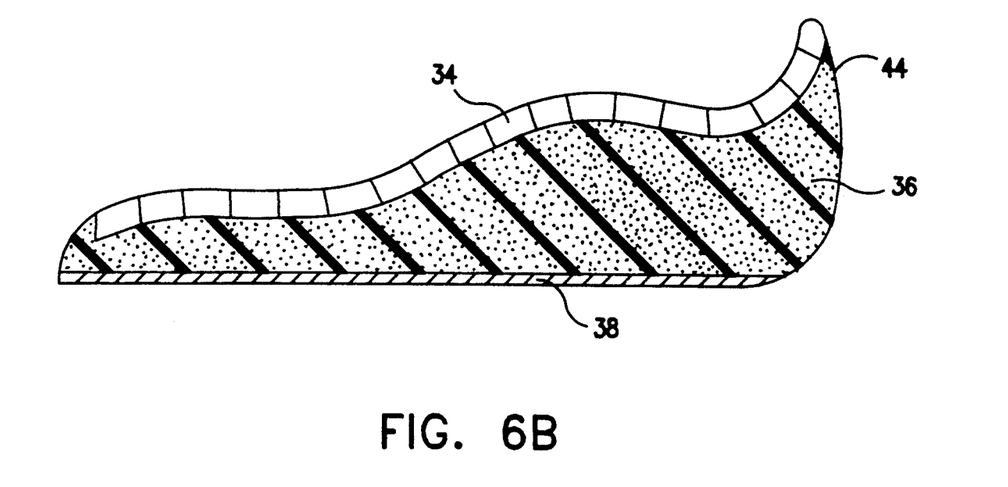
FIG. 6b is a cross sectional view, taken along the line 6—6 of FIG. 6a, illustrating how the honeycomb padding is placed to cover a substantial portion of the top surface of the seat, including the upwardly curving rear portion.

FIG. 6a depicts an alternative type of seat having an upwardly curving back 44 in addition to a standard seat area 42. FIG. 6b is a cross sectional view of the seat of FIG. 6a taken along the line 6—6. This figure illustrates the layered construction of the seat and shows how the honeycomb padding 34 continues from the front of the seat up the curving back portion 44 of the seat. This padded back portion will cushion and protect the rider's coccyx.

Figure 7A:
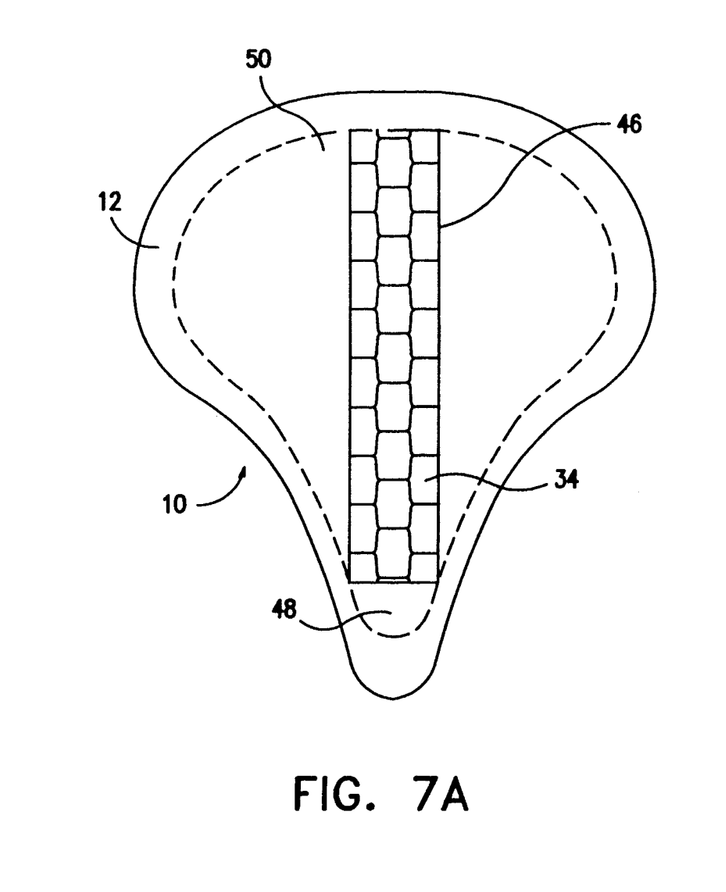
FIG. 7a is a top view of an alternative embodiment of the present invention, illustrating a seat having a transparent window disposed in the skin, through which the honeycomb padding can be seen.

FIG. 7a is a top view of another alternative embodiment of the present invention showing a standard seat 10 with a one-piece section of honeycomb padding 34 (as previously shown in FIG. 3a), and whose skin 12 has a transparent window 46 through which the honeycomb padding 34 can be viewed. In FIG. 7a, the window is narrow, rectangularly shaped, and runs from the front of the seat 48 to the rear of the seat 50. The full area of the padding underneath the skin is shown in dashed lines.

Figure 7B:
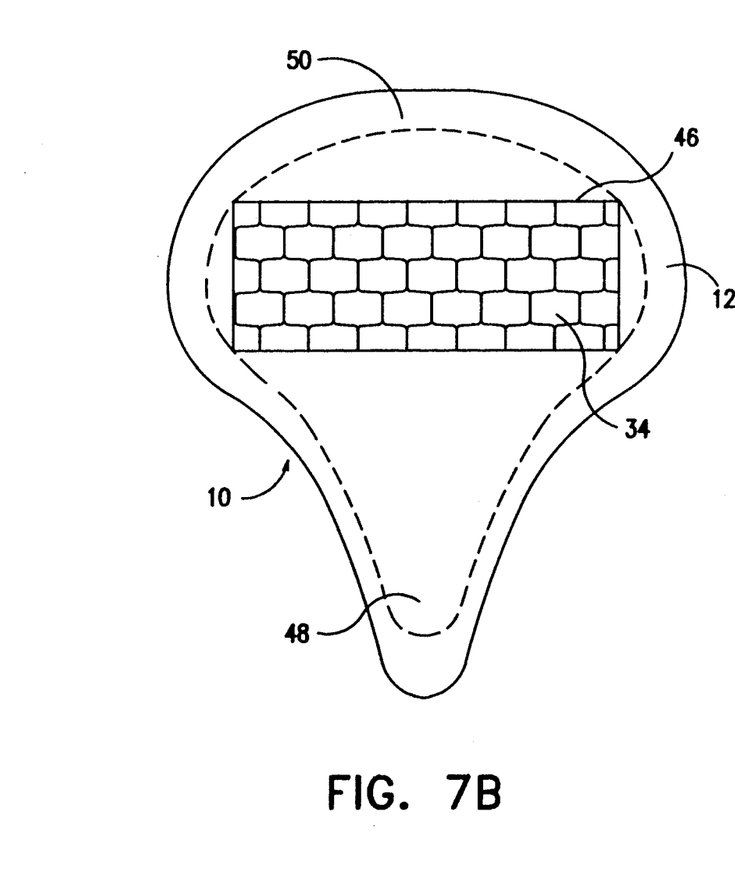
FIG. 7b is a top view of an alternative embodiment of the present invention, similar to FIG. 7a, showing a different window configuration.

FIG. 7b is similar to FIG. 7a, however the window 46 is disposed only in the rear portion 50 of the seat cover. The window is included for aesthetic reasons only. For seats such as those in FIGS. 7a and 7b, environmental additives will be incorporated into the thermoplastic materials used to manufacture the honeycomb padding so that the plastic will not yellow from exposure. Since the ribbons of material that make up the honeycomb core can be of any color desired, solid or multi-colored honeycomb pads can be used in a seat containing a window to add a cosmetic flair to the seat. The facings too can be transparent or colored.

Figure 8:
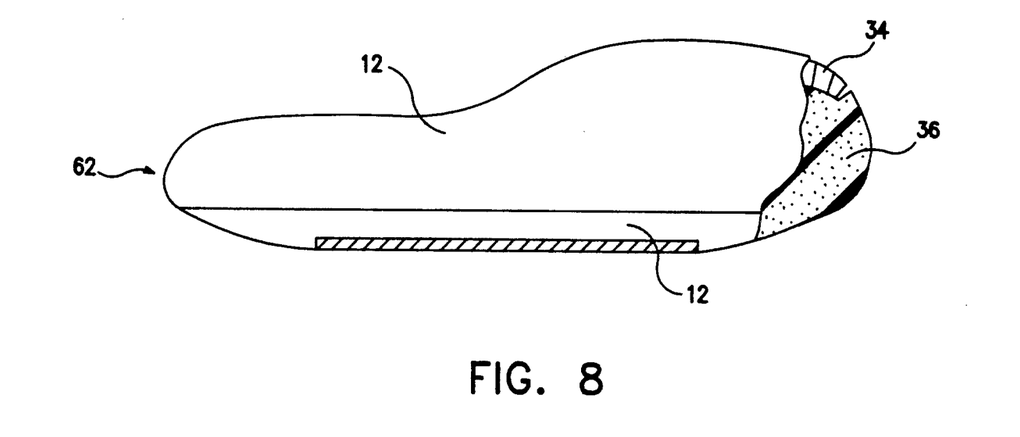
FIG. 8 is a side view of an alternative embodiment of the present invention, showing a padded cover for a bicycle seat partially broken to better illustrate its layered construction.

Another alternative embodiment is shown in FIG. 8. It is a multilayer bicycle seat cover 62 which incorporates the foam 36, honeycomb padding 34 and skin 12 layers as described for the preferred embodiment, together in a removable seat cover. Another option would be a seat cover, as described, sans the foam layer. The seat cover does not include a rigid shell because the stock bicycle seat that the seat cover is fitted over acts as the shell. The cover is secured to the seat by drawing together the excess skin underneath the seat via a drawstring or by elasticizing the edges of the skin disposed at the base of the covered seat to secure the cover to the seat.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An improved bicycle seat comprising:
    a rigid shell having means for affixing the shell to a bicycle, said shell having a rear portion and a front portion, said rear portion being wider than said front portion;
    a layer of resilient foam disposed atop said rigid shell and having an outline substantially similar to that of said rigid shell;
    a honeycomb pad affixed to said resilient foam having a core made from strips of material bonded together to form the walls of a honeycomb-like network of generally hexagonally shaped cells, the walls of said cells each having upper edges and lower edges;
    a first sheet of resilient facing material thermal compression bonded to one surface of said core formed by said upper and lower edges, to form a body of singly faced core material;
    a second sheet of resilient facing material thermal compression bonded to the unfaced surface of said core to form a body of doubly faced core material wherein air is encapsulated within each of said cells; and
    wherein one of said sheets of facing material has a plurality of holes formed therein, said holes being disposed proximate the center of each of said air-filled cells to ventilate said padding.

2. A multilayer padded bicycle seat cover for use with a standard bicycle seat to cushion a rider's body, comprising:
    a layer of thermoplastic elastomeric honeycomb-structured padding made from strips of material bonded together to form the walls of a honeycomb-like network of generally hexagonally shaped cells, the walls of said cells each having upper edges and lower edges, said padding being disposed atop a foam layer;
    a sheet of durable material encapsulating said foam layer and said honeycomb padding, and having means for securely attaching said seat cover to said bicycle seat;
    a first sheet of resilient facing material, thermal compression bonded to one of said edges of said cells to form a body of singly faced core material;
    a second sheet of resilient facing material, thermal compression bonded to the unfaced edge of said cells to form a body of doubly faced core material; and
    wherein one of said sheets of facing material has a plurality of holes, said holes being disposed proximate the center of each of said air-filled cells, whereby said padding is thus ventilated.

* * * * *